(12) United States Patent
Sajima

(10) Patent No.: US 9,839,812 B2
(45) Date of Patent: Dec. 12, 2017

(54) GOLF BALL AND MANUFACTURING METHOD THEREOF

(71) Applicant: DUNLOP SPORTS CO. LTD., Kobe-shi, Hyogo (JP)

(72) Inventor: Takahiro Sajima, Kobe (JP)

(73) Assignee: DUNLOP SPORTS CO. LTD., Kobe-shi, Hyogo (JP)

( * ) Notice: Subject to any disclaimer, the term of this patent is extended or adjusted under 35 U.S.C. 154(b) by 19 days.

(21) Appl. No.: 14/878,152

(22) Filed: Oct. 8, 2015

(65) Prior Publication Data

US 2016/0184647 A1 Jun. 30, 2016

(30) Foreign Application Priority Data

Dec. 26, 2014 (JP) .................. 2014-266182

(51) Int. Cl.

| | |
|---|---|
| *A63B 37/06* | (2006.01) |
| *A63B 37/00* | (2006.01) |
| *B29C 70/70* | (2006.01) |
| *A63B 45/00* | (2006.01) |
| *A63B 45/02* | (2006.01) |
| *B29L 31/54* | (2006.01) |
| *B29K 9/00* | (2006.01) |

(52) U.S. Cl.
CPC ...... *A63B 37/0019* (2013.01); *A63B 37/0022* (2013.01); *A63B 45/00* (2013.01); *A63B 45/02* (2013.01); *B29C 70/70* (2013.01); *A63B 37/0074* (2013.01); *A63B 37/0075* (2013.01); *B29K 2009/00* (2013.01); *B29L 2031/546* (2013.01)

(58) Field of Classification Search
CPC ............................ A63B 37/0022; A63B 37/12
USPC ............................................... 473/378
See application file for complete search history.

(56) References Cited

U.S. PATENT DOCUMENTS

| | | | |
|---|---|---|---|
| 9,033,825 B2 | 5/2015 | Anderl et al. | |
| 9,033,826 B2 | 5/2015 | Fitchett et al. | |
| 9,108,085 B2 | 8/2015 | Fitchett et al. | |
| 9,409,064 B2* | 8/2016 | Fitchett | A63B 37/0022 |
| 2011/0077106 A1 | 3/2011 | Fitchett | |
| 2011/0250989 A1* | 10/2011 | Umezawa | A63B 37/0004 473/374 |
| 2012/0184397 A1 | 7/2012 | Fitchett et al. | |

(Continued)

FOREIGN PATENT DOCUMENTS

| | | |
|---|---|---|
| JP | 2002-369896 A | 12/2002 |
| JP | 2004-147836 A | 5/2004 |

(Continued)

*Primary Examiner* — Raeann Gorden
(74) *Attorney, Agent, or Firm* — Birch, Stewart, Kolasch & Birch, LLP

(57) ABSTRACT

A golf ball of one aspect of the present invention includes a spherical core, one or more cover members to cover the core, and a coating layer to coat a cover member configuring an outermost layer of the one or more cover members. A plurality of dimples is formed in the cover member of the outermost layer. Roughness is produced on a surface of the coating layer after applying a coat over the cover member of the outermost layer. An average value Fa (mm) of maximum depths of the plurality of dimples and arithmetic average roughness Ra (μm) on the surface of the coating layer, satisfy a relational expression:

$-1.5 \times Fa + 0.8 \leq Ra \leq -1.5 \times Fa + 1.8$.

3 Claims, 6 Drawing Sheets

(56) References Cited

U.S. PATENT DOCUMENTS

| | | | |
|---|---|---|---|
| 2012/0283043 | A1 | 11/2012 | Fitchett et al. |
| 2012/0302374 | A1 | 11/2012 | Yontz et al. |
| 2012/0302375 | A1 | 11/2012 | Fitchett et al. |
| 2012/0329367 | A1 | 12/2012 | Fitchett et al. |

FOREIGN PATENT DOCUMENTS

| | | |
|---|---|---|
| JP | 2007-260317 A | 10/2007 |
| JP | 2014-520654 A | 8/2014 |

\* cited by examiner

GOLF BALL AND MANUFACTURING METHOD THEREOF

CROSS REFERENCE

This application claims priority to Japanese Patent Application No. 2014-266182 filed on Dec. 26, 2014, which is hereby incorporated by reference in its entirety.

FIELD

The present invention pertains to a golf ball and a manufacturing method thereof.

BACKGROUND

The golf ball has a multiplicity of dimples on its surface. The dimples causes turbulence of air flows around the golf ball when flying, thereby creating a turbulent separated flow. This phenomenon is referred to as "creation of turbulence", and this creation of turbulence shifts backward an air separation point from the golf ball, resulting in reducing drag (force acting in a direction of repulsion against a flying direction). The creation of turbulence increasingly enlarges a deviation between an upper air separation point and a lower air separation point of the golf ball due to a backspin, thereby augmenting a dynamic lift acting on the golf ball. Accordingly, well-designed dimples create better turbulence of the air flows and produce a longer carry.

In recent years, a technology has been also developed to enhance aerodynamic characteristics by polishing the surface of the golf ball in addition to contriving a shape of a dimple. For instance, Japanese Patent Application Laid-Open Publication No. 2004-14783 proposes a method for applying a blast treatment over the surface of a coating layer in order to reduce the drag when the golf ball flies. Another instance is that Japanese Patent Application Laid-Open Publication No. 2007-260317 proposes a method for applying a rough surface work to a bottom surface of the dimple in order to reduce the drag and improve the dynamic lift when the golf ball flies. Still another instance is that Japanese Patent Application Laid-Open Publication No. 2002-369896 proposes a method for forming micro dimples each having a diameter equal to or smaller than ½ as small as a diameter of the dimple formed by the blast treatment in order to extend the carry of the golf ball. Yet another instance is that Japanese Translation of PCT International Application Publication No. 2014-520654 proposes a method for providing roughness to the surface by polishing the surface of the golf ball in order to have an influence on aerodynamic performance of the golf ball.

A long carry is demanded of a driver shot, and, however, when an extra dynamic lift is caused by the influence of the dimples, a flying golf ball has a hopping trajectory, resulting a possibility that the carry shortens. Although a variety of examinations have hitherto been made not to generate the hopping trajectory in designing the dimples, this problem still remains unsolved, and it is desirable to develop a method for improving the aerodynamic performance of the golf ball not confined to the design of the dimple.

SUMMARY

There has been also developed a technology of enhancing the aerodynamic performance of the golf ball by producing the roughness on the surface of the golf ball. However, a process of producing the roughness on the surface of the golf ball and the design of the dimples has been examined separately and independently. In other words, the dimple and the surface roughness are given as two factors for influencing the aerodynamic performance of the golf ball, and, however, no examination about a correlation between these two factors has been made so far. Inventors of the present invention found out this point and reached an idea of having a feasibility of improving the carry of a hitting ball of the driver shot by attaining decreases in drag and in dynamic lift of the flying golf ball owing to the correlation between the dimple and the surface roughness.

A golf ball according to one aspect of the present invention includes a spherical core, one or more cover members to cover the core, and a coating layer to coat a cover member configuring an outermost layer of the one or more cover members. A plurality of dimples is formed in the cover member of the outermost layer, roughness is produced on a surface of the coating layer after applying a coat over the cover member of the outermost layer, and an average value Fa (mm) of maximum depths of the plurality of dimples and arithmetic average roughness Ra (μm) on the surface of the coating layer, satisfy a relational expression given in following Mathematical Expression 1.

$$-1.5 \times Fa + 0.8 \leq Ra \leq -1.5 \times Fa + 1.8. \quad \text{[Mathematical Expression 1]}$$

Note that a unit of "Fa" in the relational expression of Mathematical Expression 1 is "mm" (millimeter), and a unit of "Ra" is "μm" (micrometer). Only values of Fa and Ra are substituted into Mathematical Expression 1 without taking account of these units.

According to the configuration described above, the relational expression given in Mathematical Expression 1 specifies the correlation between the depth of the dimple and the surface roughness of the coating layer. As demonstrated in Examples that will be described later on, the inventors of the present invention found out that the carry of the drive shot was improved when the depth of the dimple and the surface roughness of the coating layer had the correlation given in Mathematical Expression 1. In other words, the configuration described above enables the flying performance of the golf ball to be enhanced owing to a multiplier effect of the depth of the dimple and the surface roughness of the coating layer.

In the golf ball according to one aspect, the arithmetic average roughness Ra on the surface of the coating layer may be equal to or larger than 0.4 μm.

In the golf ball according to one aspect, the roughness on the surface of the coating layer may be acquired by a surface treatment of spraying fine particles over the surface.

A method for manufacturing a golf ball according to another aspect of the present invention includes: a step of forming a spherical core; a step of covering the core with one or more cover members, and forming a plurality of dimples in a cover member configuring an outermost layer of the one or more cover members; a step of coating the cover member of the outermost layer with a coating layer; and a step of producing roughness on a surface of the coating layer, and an average value Fa (mm) of maximum depths of the plurality of dimples to be formed and arithmetic average roughness Ra (μm) on the surface of the coating layer, satisfy a relational expression given in Mathematical Expression 1.

DESCRIPTION OF EMBODIMENT

An embodiment (which will hereinafter be also termed the present embodiment) according to one aspect of the present invention, will be described based on the drawings. However, the present embodiment, which will be discussed below, is merely an exemplification of the present invention in every respect. A variety of improvements and modifications may be made without deviating from the scope of the present invention. In other words, a specific configuration corresponding to the embodiment may be properly adopted upon carrying out the present invention. Note that the description will be made based on directions on planes of the drawings for the convenience of explanation in the following discussion.

§1 Example of Configuration

[Golf Ball]

Figure 1:
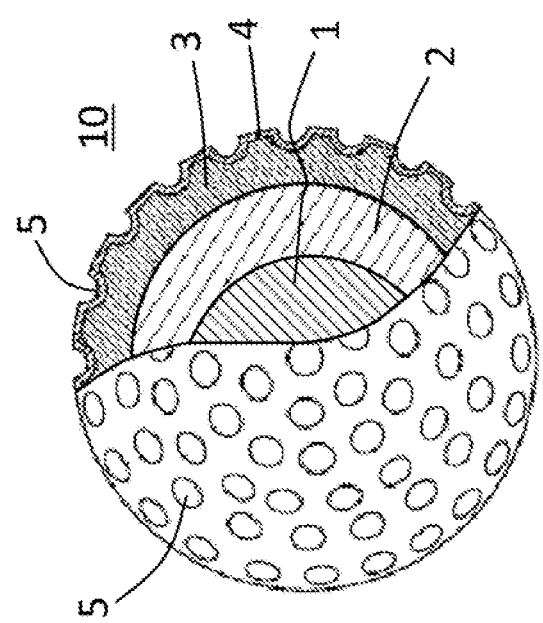
FIG. 1 is a sectional view with some portions being cut off, schematically illustrating a golf ball according to an embodiment.
Figure 2:
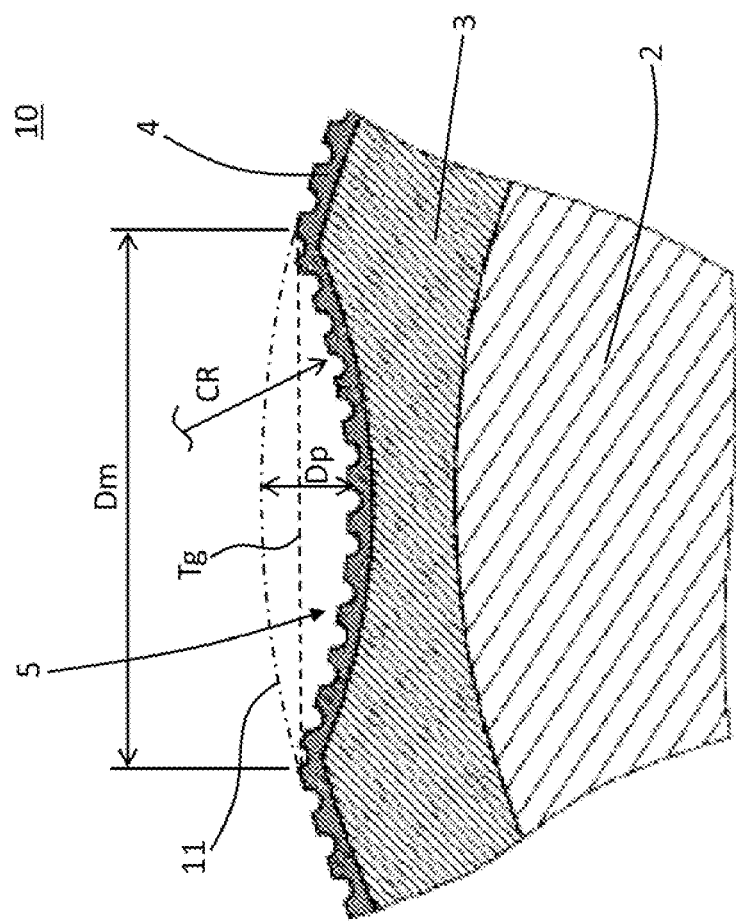
FIG. 2 is a partially enlarged sectional view schematically depicting the golf ball according to the embodiment.

A golf ball 10 according to the present embodiment will be described with reference to FIGS. 1 and 2. FIG. 1 is a sectional view with some portions being cut off, schematically illustrating the golf ball 10 according to the present embodiment. FIG. 2 is a partially enlarged sectional view schematically depicting the golf ball 10 according to the embodiment.

As illustrated in FIG. 1, the golf ball 10 according to the embodiment includes a spherical core 1, an intermediate layer 2 covering the core 1, a cover 3 covering the intermediate layer 2, a plurality of dimples 5 formed over the surface of the cover 3, and a coating layer 4 coated over the surface of the cover 3. These components will hereinafter be described.

Note that a diameter of the golf ball 10, though properly settable, is preferably 40 mm to 45 mm, and further preferably 42.67 mm or larger in terms of satisfying standards of United States Golf Association (USGA). It is also preferable in terms of restraining air resistance that the diameter of the golf ball 10 is set equal to or smaller than 44 mm and more preferably equal to or smaller than 42.80 mm. It is preferable that a mass of the golf ball 10 is equal to or larger than 40 g and equal to smaller than 50 g. Especially in terms of obtaining a large inertia, the mass of the golf ball 10 is, preferably, equal to or larger than 44 g and further preferably equal to or larger than 45.00 g. In terms of satisfying the standards of USGA, it is preferable that the mass of the golf ball 10 is equal to or smaller than 45.93 g.

<Core>

The description starts with the core 1. The core 1 is configured by crosslinking rubber compositions. A material of the core 1 may be suitably selected, and a base rubber of the rubber composition of the core 1 is exemplified by polybutadiene, polyisoprene, styrene-butadiene copolymer, ethylene-propylene-diene copolymer, and a natural rubber. Two or more types of rubbers may be used in combination as the material of the core 1. The material of the core 1 is preferably polybutadiene and, more preferably, high cis-polybutadiene in particular in terms of performance of repulsion.

The rubber composition of the core 1 contains a co-cross-linking agent. The co-cross-linking agents being preferable in terms of the performance of repulsion are zinc acrylate, magnesium acrylate, zinc methacrylate and magnesium methacrylate. It is preferable that the rubber composition contains organic peroxide together with the co-cross-linking agent. The preferable organic peroxide is exemplified by dicumyl peroxide, 1,1-bis(t-butyl peroxy)-3,3,5-trimethyl-cyclohexane, 2,5-dimethyl-2,5-di(t-butyl peroxy) hexane, and di-t-butyl peroxide.

The rubber composition of the core 1 may contain additive agents instanced by a filler, sulphur, a vulcanization accelerator, a sulphur compound, an antioxidant, a coloring agent, a plasticizing agent, a dispersant, carboxylic carboxylate and other equivalent additive agents. The rubber composition of the core 1 may further contain synthetic resin powder or cross-linked rubber powder.

The diameter of the core 1, though properly settable, is preferably equal to or larger than 30.0 mm, and more preferably equal to or larger than 38.0 mm. On the other hand, the diameter of the core 1 is preferably equal to or smaller than 42.0 mm and more preferably equal to or smaller than 41.5 mm. The core 1 may have two or more layers. A shape of the core 1 is not limited to a particular shape if spherical on the whole, and the core 1 may have ribs on the surface. The core 1 according to the present embodiment is solid, and may also be hollowed.

Note that a compressive deformation quantity of the core 1 may be properly set. However, when the compressive deformation is by far smaller than the general standard, a ball hit feeling possibly becomes harder. Therefore, the compressive deformation quantity of the core 1 is preferably equal to or larger than 2 mm and more preferably equal to or larger than 2.5 mm from this point of view. Whereas when the compressive deformation quantity of the core 1 is by far larger than the general standard, a ball speed upon hitting is decelerated in terms of the performance of repulsion, resulting in a possibility that flying performance becomes deteriorated. Therefore, from this point of view, the compressive deformation quantity of the core 1 is preferably equal to or smaller than 6 mm and more preferably equal to or smaller than 5.5 mm. The compressive deformation quantity can be measured by an optional method.

<Intermediate Layer>

Next, the intermediate layer 2 will be described. The intermediate layer 2 is composed of a resin composition. Although a material of the intermediate layer 2 can be suitably selected, a preferable base polymer of the resin composition of the intermediate layer 2 is an ionomer resin. The preferable ionomer resin can be exemplified by binary copolymer of α-olefin and α,β-unsaturated carboxylic acid with a carbon number being "3" or above and "8" or under. Another preferable ionomer resin can be exemplified by ternary copolymer of α-olefin, α,β-unsaturated carboxylic acid with the carbon number being "3" or above and "8" or under, and α,β-unsaturated carboxylic ester with the carbon number being "2" or above and "22" or under. In the binary copolymer and the ternary copolymer, the preferable α-olefin is ethylene or propylene, and the preferable α,β-unsaturated carboxylic acid is acrylic acid or methacrylic acid. In the binary copolymer and the ternary copolymer, a part of carboxyl group is neutralized with metal ions. The metal ions for neutralization are exemplified by a natrium ion, a potassium ion, a lithium ion, a zinc ion, a calcium ion, a magnesium ion, an aluminum ion and a neodymium ion.

The resin composition of the intermediate layer 2 may contain another polymer in place of the ionomer resin. Another polymer is exemplified by polystyrene, polyamide, polyester, polyolefin and polyurethane. The resin composition of the intermediate layer 2 may contain two or more types of polymers.

The resin composition of the intermediate layer 2 may contain the coloring agent instanced by titanium dioxide, the filler instanced by barium sulfate, the dispersant, an antioxidant, an ultraviolet absorber, a light stabilizer, a fluorescent agent, fluorescent brightener, and other equivalent agents. Further, the resin composition of the intermediate layer 2 may contain powders of high density metals instanced by tungsten, molybdenum and other equivalent metals for the purpose of adjusting a relative density.

A thickness of the intermediate layer 2, though properly settable, is preferably equal to or larger than 0.2 mm and more preferably equal to or larger than 0.3 mm. On the other hand, the thickness of the intermediate layer 2 is preferably equal to or smaller than 2.5 mm and more preferably equal to or smaller than 2.2 mm. The relative density of the intermediate layer 2 is preferably equal to or larger than 0.90 and more preferably equal to or larger than 0.95. The relative density of the intermediate layer 2 is preferably equal to or smaller than 1.10 and more preferably equal to or smaller than 1.05. The intermediate layer 2 may have two or more layers. For instance, a reinforcing layer can be disposed outside the intermediate layer 2.

Hardness of the intermediate layer 2 can be properly set. However, when the intermediate layer 2 is by far softer than the general standard, there exists a possibility of not adjusting a spin quantity caused when hitting the ball by a driver or a middle iron in terms of being tough on the outside but soft at the heart of the ball structure. Therefore, the hardness, i.e., Shore-D hardness, of the intermediate layer 2 is preferably equal to or larger than 30 and more preferably equal to or larger than 35 from this point of view. Whereas when the intermediate layer 2 is by far harder than the general standard, there is likelihood that the ball hitting feeling becomes harder. From this point of view, the Shore-D hardness of the intermediate layer 2 is preferably equal to or smaller than 75 and more preferably equal to or smaller than 70. Note that the Shore-D hardness can be measured by, e.g., a method that follows. A sheet having a thickness of approximately 2 mm is manufactured based on injection molding by using the resin compositions configuring the intermediate layer 2 and other equivalent components, and is preserved for 2 weeks at 23° C. Three or more sheets are stacked not to cause influence of a measurement substrate, in which state the Shore-D hardness is measured by an automatic rubber hardness meter P1 type manufactured by Kobunshi Keiki Co., Ltd., the mete P1 type being equipped with a spring hardness meter Shore-D type specified in ASTM-D2240 (American Society for Testing and Materials D2240). The Shore-D hardness of the intermediate layer 2 and other equivalent components can be thus measured.

<Cover>

Next, the cover 3 will be described. The cover 3 is composed of the resin composition. Though a material of the cover 3 can be suitably selected, a preferable base polymer of the resin composition of the cover 3 is polyurethane. The resin composition of the cover 3 may contain thermoplastic polyurethane and may also contain thermosetting polyurethane. The resin composition of the cover 3 is the thermoplastic polyurethane that is preferable in terms of productivity. The thermoplastic polyurethane contains a polyurethane component as a hard segment, and a polyester component or a polyether component as a soft segment.

A curing agent of the polyurethane component is exemplified by alicyclic diisocyanate, aromatic diisocyanate, and aliphatic diisocyanate. Particularly, the preferable curing agent is the alicyclic diisocyanate. The alicyclic diisocyanate has none of double bond in a main chain, and hence yellow discoloration of the cover 3 is restrained. The alicyclic diisocyanate is exemplified by 4,4,-dicyclohexyl methane diisocyanate (H12MDI), 1,3-bis(isocyanatomethyl) cyclohexane (H6XDI), isophorone diisocynate (IPDI), and trans-1,4-cycloxane diisocyanate (CHDI). The H12MDI is preferable in terms of general purpose properties and workability.

The resin composition of the cover 3 may contain another polymer in place of polyurethane. Another polymer is exemplified by the ionomer resin, polyethylene, polyamide, polyester and polyolefin. The resin composition of the cover 3 may contain two or more types of polymers. Further, the resin composition of the cover 3 may also contain the coloring agent instanced by titanium dioxide, the filler instanced by barium sulfate, the dispersant, the antioxidant, the ultraviolet absorber, the light stabilizer, the fluorescent agent, the fluorescent brightener, and other equivalent agents.

A thickness of the cover 3, though properly settable, is preferably equal to or larger than 0.2 mm and more preferably equal to or larger than 0.3 mm. The thickness of the cover 3 is preferably equal to or smaller than 2.5 mm and more preferably equal to or smaller than 2.2 mm. The relative density of the cover 3 is preferably equal to or larger than 0.90 and more preferably equal to or larger than 0.95. The relative density of the cover 3 is preferably equal to or smaller than 1.10 and more preferably equal to or smaller than 1.05. Note that the cover 3 may have two or more layers.

The hardness of the cover 3 can be properly set corresponding to the embodiment without being limited in particular. It is, however, preferable to set the hardness of the cover 3 in terms of adjusting the spin quantity in a driver shot and an approach shot so that the Shore-D hardness is equal to or larger than 30. The Shore-D hardness of the cover 3 is preferably equal to or larger than 32 and more preferably equal to or larger than 34. On the other hand, the Shore-D hardness of the cover 3 is preferably equal to or smaller than 70 in terms of a player's ball hit feeling. When the hardness of the cover 3 is larger than this level, there arises a possibility of causing a decline of the player's ball hit feeling such as not feeling a solid touch of the golf ball 10 on the face, not feeling a firm catch, not feeling a sticky contact and not feeling an effective spin. The Shore-D hardness of the cover 3 is preferably equal to or smaller than 69 and more preferably equal to or smaller than 68. The Shore-D hardness of the cover 3 can be measured by the same method for the intermediate layer 2.

Note that each of the intermediate layer 2 and the cover 3 corresponds to a "cover member" according to the present invention. The cover 3 corresponds to a "cover member configuring an outermost layer" according to the present invention.

<Dimple>

Figure 3:
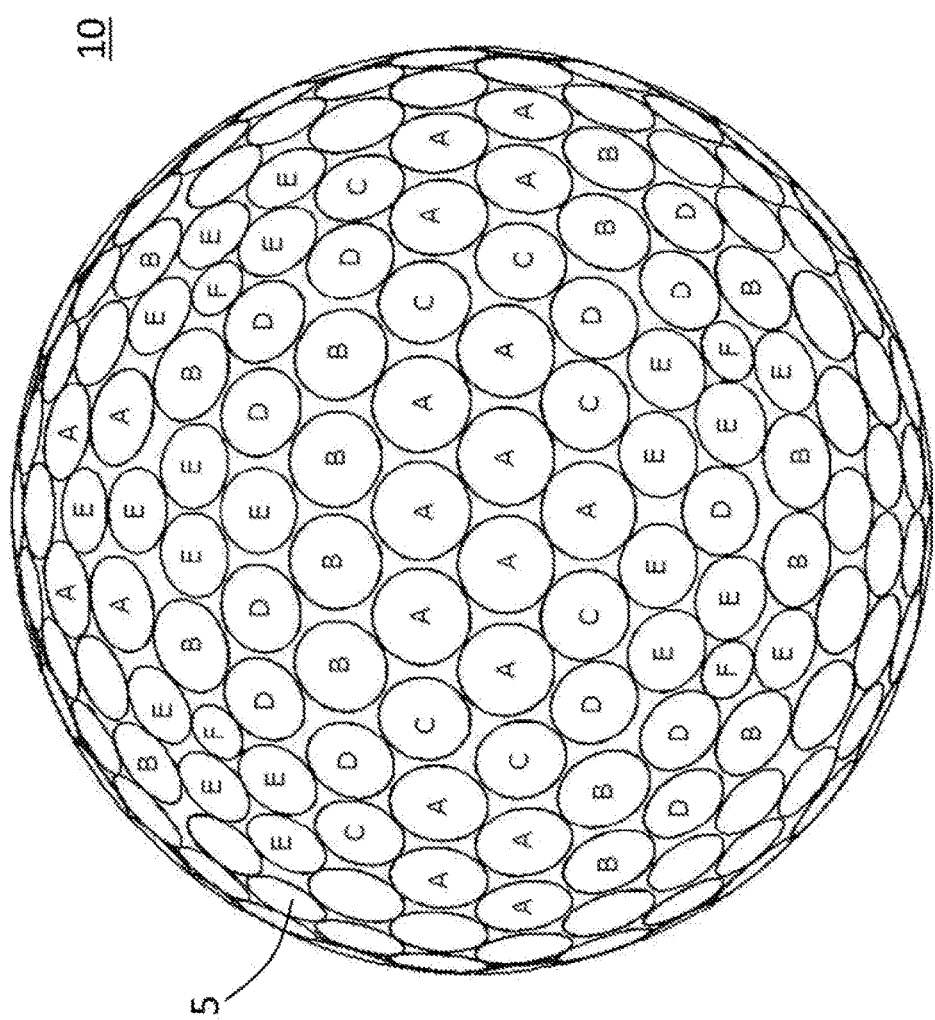
FIG. 3 is a front view of the golf ball 1 according to the embodiment.
Figure 4:
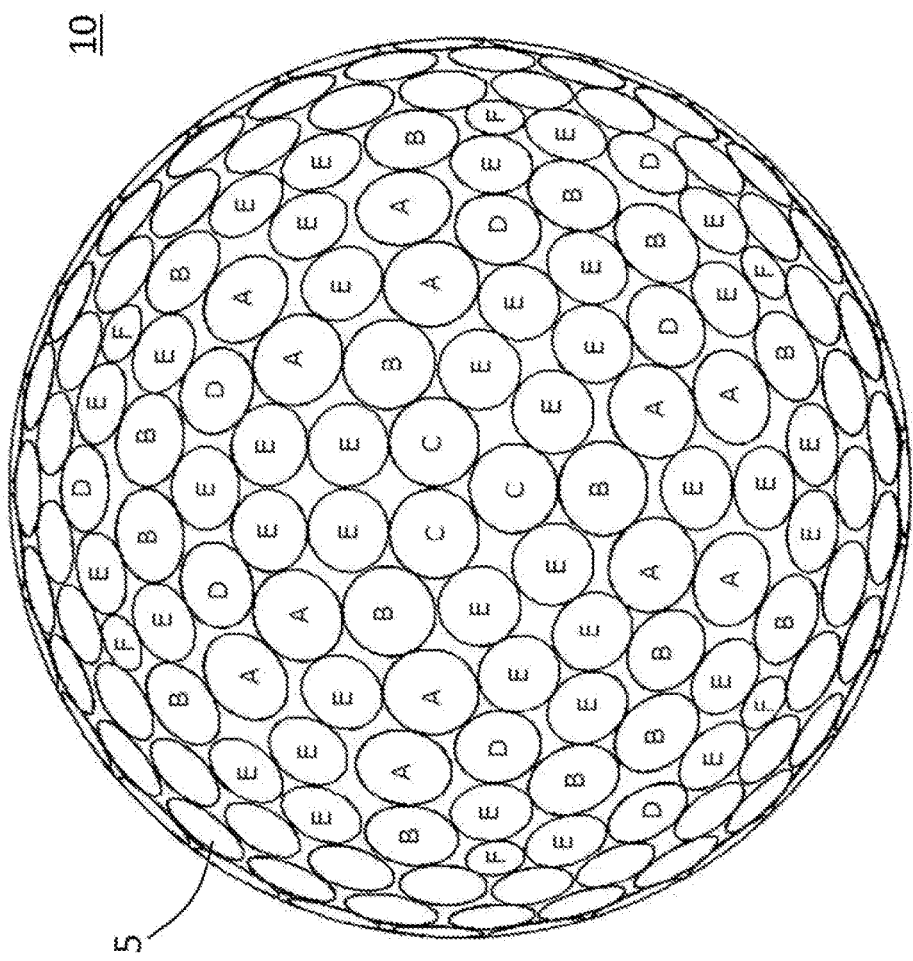
FIG. 4 is a plan view of the golf ball according to the embodiment.

Next, the dimples 5 will be described further with reference to FIGS. 3 and 4. FIG. 3 is a front view of the golf ball 10. FIG. 4 is a plan view of the golf ball according to the embodiment. As illustrated in FIGS. 1 to 4, a plurality of dimples 5 is formed over the surface of the cover 3. As depicted in FIG. 2, the dimple 5 is a recessed in concave from the surface of an imaginary ball, and takes a circular arc shape in section.

As illustrated in FIGS. 3 and 4, the dimple 5 according to the present embodiment is formed in the circular shape as viewed on the plane. A diameter Dm of the dimple 5 formed in the circular shape can be indicated by a distance between both end portions of the dimple 5, to which a straight line Tg is tangent, when depicting the straight line Tg along the dimple 5 as illustrated in FIG. 2. The diameter Dm of the dimple 5, though properly settable, is set preferably within a range of 2.0 mm to 6.0 mm. The dimples 5 with the diameter Dm being equal to or larger than 2.0 mm contributes to the creation of turbulence of the golf ball 10. From this point of view, the diameter Dm of the dimple 5 is more preferably equal to or larger than 2.2 mm and much more preferably equal to or larger than 2.4 mm. While on the other hand, when the diameter Dm of the dimple 5 exceeds 6.0 mm, an external appearance of the spherical golf ball 10 is spoiled. From this point of view, the diameter Dm of the dimple 5 is more preferably equal to or smaller than 5.8 mm and much more preferably equal to or smaller than 5.6 mm.

A curved line 11 (one-dotted chain line) in FIG. 2 represents the surface of the golf ball 10 (which will hereinafter be referred to as the "imaginary ball") on the assumption that the dimple 5 does not exist. Therefore, a maximum depth Dp of the dimple 5 can be, as illustrated in FIG. 2, indicated by a distance between the surface (curved line 11) of the imaginary ball and a deepest portion of the dimple 5. Such a maximum depth Dp of the dimple 5, though properly settable, is preferably equal to or larger than 0.10 mm, more preferably equal to or larger than 0.13 mm, and much more preferably equal to or larger than 0.15 mm in terms of restraining the golf ball 10 from hopping during the flight. On the other hand, the maximum depth Dp of the dimple 5 is preferably equal to or smaller than 0.65 mm, more preferably equal to or smaller than 0.55 mm, and much more preferably equal to or smaller than 0.40 mm in terms of restraining the golf ball 10 from dropping during the flight.

Note that an average value Fa (mm) of the maximum depths Dp of the dimples 5 can be calculated by dividing a total of the maximum depths Dp of all of the dimples 5 by a number of dimples 5. This average value Fa (mm) may be utilized as an index for representing a shape of each dimple 5. The average value Fa (mm) can be properly set to satisfy a relational expression given in Mathematical Expression 1 described above. However, when the average value Fa (mm) is by far smaller than the general standard, a flight line of the ball appears to hop, resulting in an increased possibility of the carry being ill-affected. Whereas when the average value Fa (mm) is by far larger than the general standard, the flight line of the ball is lowered, resulting in the increased possibility of the carry being ill-affected. From this point of view, the average value Fa (mm) of the maximum depths of the dimples 5 is set preferably within a range of 0.18 mm to 0.33 mm, more preferably within a range of 0.20 mm to 0.32 mm, and much more preferably within a range of 0.22 mm to 0.31 mm.

Herein, a portion surrounded by the surface (curved line 11) of the imaginary ball and the surface of the dimple 5 can be grasped as a volume of the dimple 5. A total volume of the dimples 5 can be calculated by adding the volumes of all of the dimples 5. The total volume of the dimples 5, though properly settable, is preferably equal to or larger than $450=^3$, more preferably equal to or larger than 480 mm³, and much more preferably equal to or larger than 500 mm³ in terms of restraining the golf ball 10 from hopping during the flight. While on the other hand, the total volume of the dimples 5 is preferably equal to or smaller than 750 mm³, more preferably equal to or smaller than 730 mm³, and much more preferably equal to or smaller than 710 mm³ in terms of restraining the golf ball 10 from dropping during the flight.

An area size of the dimple 5 can be obtained from an area circumscribed by a borderline of the dimple 5. In other words, the area size of the dimple 5 can be defined by an area size of the area circumscribed by an edge line when a center of the golf ball is viewed from infinity. A total area size of the dimples 5 can be calculated by adding the area sizes of all of the dimples 5. A ratio, at which the total area size of the dimples 5 occupies a surface area size of the imaginary ball, is referred to as a surface area occupancy.

The surface area occupancy of the dimples 5, though properly settable, is set preferably within a range of 70% to 95%. When the surface area occupancy of the dimples 5 is smaller than 70%, the dynamic lift of the golf ball 10 during the flight is likely to become deficient. From this point of view, the surface area occupancy of the dimples 5 is more preferably 72% or larger, and much more preferably 75% or larger. On the other hand, when the surface area occupancy of the dimples 5 exceeds 95%, there exists an increased possibility that the golf ball 10 hops during the flight. From this point of view, the surface area occupancy of the dimples 5 is more preferably 93% or smaller, and much more preferably 91% or smaller.

A total number of dimples 5, though properly settable, is set preferably within a range of 200 to 500. When the total number of dimples 5 is smaller than 200, the surface area occupancy described above is difficult to be attained, resulting in a likelihood that an effect of improving flight characteristics of the golf ball 10 is hard to be acquired. From this point of view, the total number of dimples 5 is preferably equal to or larger than 230, and more preferably equal to or larger than 260. Whereas when the total number of dimples 5 exceeds 500, the area size of each individual dimple 5 diminishes, which leads to a likelihood that the dimple 5 is hard to contribute to the creation of turbulence. From this point of view, the total number of the dimples 5 is more preferably equal to or smaller than 470 and much more preferably equal to or smaller than 440.

Note that each dimple 5 is formed in the circular shape as viewed on the plane in FIGS. 3 and 4. However, the shape of the dimple 5 may not be circular but may be appropriately formed corresponding to the embodiment. All of the dimples 5 may take the same shape, and the dimples 5 taking different shapes from those of other dimples 5 may coexist. For instance, as depicted in FIGS. 3 and 4, plural types of dimples 5 having different diameters Dm may exist in mixture. And, the dimples 5 having different shapes may exist in mixture. An arrangement of the dimples 5 may be appropriately determined corresponding to the embodiment.

<Coating Layer>

Next, the coating layer 4 will be described. As illustrated in FIGS. 1 and 2, the coating layer 4 is formed by applying a coating material over the surface of the cover 3, and is configured to coat the cover 3. The coating material for forming the coating layer 4 may be suitably selected corresponding to the embodiment. For instance, this type of coating material may involve using a clear coating material containing two-part curing type polyurethane as the base.

A thickness of the coating layer 4, though properly settable, is preferably equal to or larger than 5.0 µm, more preferably equal to or larger than 5.5 µm, and much more preferably equal to or larger than 6.0 µm. This is because of there being a possibility that the coating layer 4 exfoliates from the cover 3 in the process of forming roughness that will be described later on when the thickness of the coating layer 4 is smaller than 5.0 μm. On the other hand, when the thickness of the coating layer 4, though an upper limit of the thickness is not particularly restricted, augments, a quantity of the coating material to be applied increases, resulting in difficulty to uniform the thickness of the coating layer 4 over than whole golf ball 10. From this point of view, the thickness of the coating layer 4 is preferably equal to or smaller than 30 μm.

Hardness of the coating layer 4, though properly settable, is preferably set so that a 10% modulus of the coating layer 4 is equal to or smaller than 160 kgf/cm$^2$. When the 10% modulus of the coating layer 4 is large, the approach shot has a possibility of decreasing the spin quantity of the golf ball 10. From this point of view, the 10% modulus of the coating layer 4 is more preferably equal to or smaller than 150 kgf/cm$^2$ and much more preferably equal to or smaller than 140 kgf/cm$^2$. On the other hand, though a lower limit of the 10% modulus of the coating layer 4 is not particularly restricted, when the 10% modulus of the coating layer 4 is by far smaller than the general standard, tack feeling remains on the surface of the golf ball 10 because the coating layer 4 is by far softer than the general standard, and the hit feeling of the golf ball 10 has a likelihood of declining. From this point of view, the 10% modulus of the coating layer 4 is preferably equal to or larger than 5 kgf/cm$^2$ and more preferably equal to or larger than 10 kgf/cm$^2$. Note that the modulus represents a stress generated when giving a fixed distortion to the member, and the 10% modulus represents a stress generated when giving a 10% distortion. The 10% modulus can be measured pursuant to the standards of JIS-K7161.

The surface of the coating layer 4 is roughed by a process that will be described later on. For instance, as depicted in FIG. 2, rugged portions (concave and convex portions) not reaching the cover 3 are formed on the coating layer 4. The roughness of the surface of the coating layer 4 can be defined by a variety of methods, and, however, the inventors of the present invention defined the roughness by using arithmetic average roughness Ra (μm). The inventors of the present invention also defined a state of the dimple 5 by using the average value Fa (mm) of the maximum depths.

The inventors of the present invention found out that the carry of the golf ball 10 increases, as will be demonstrated by working examples described later on, when the arithmetic average roughness Ra (μm) of the coating layer 4 and the average value Fa (mm) of the maximum depths of the dimples 5 satisfy the relational expression given in Mathematical Expression 1. To be specific, the present invention enables enhancement of the flight performance of the golf ball 10 owing to a multiplier effect of the dimples 5 and the roughness produced on the surface of the coating layer 4 by configuring the dimples 5 and the roughness of the surface of the coating layer 4 to satisfy the relational expression given in Mathematical Expression 1.

Note that the arithmetic average roughness Ra of the coating layer 4 can be properly set to satisfy the relational expression given in Mathematical Expression 1, and, however, when the roughness produced on the surface of the coating layer 4 is by far smaller than the general standard, there is a likelihood that an effect of the roughness is not sufficiently exhibited. Therefore, the arithmetic average roughness Ra of the coating layer 4 is preferably equal to or larger than 0.4 μm, more preferably equal to or larger than 0.45 μm, and much more preferably equal to or larger than 0.50 μm. On the other hand, though an upper limit of the arithmetic average roughness Ra is not particularly restricted, when the roughness of the coating layer 4 is by far larger than the general standard, the golf ball 10 does not acquire a neat appearance, and there is likelihood of deteriorating durability of the coating layer 4 due to a failure of adhesion of the coating layer 4 to the cover 3, exfoliation of the coating layer 4 from the cover 3, and other equivalent phenomena. From this point of view, the arithmetic average roughness Ra of the coating layer 4 is preferably equal to or smaller than 1.50 μm. Note that the arithmetic average roughness Ra of the coating layer 4 can be measured pursuant to the standards of JIS B0601.

§2 Manufacturing Method

Next, a manufacturing method of the golf ball 10 will be described. Specifically, the manufacturing method of the golf ball 10 can be separated into a manufacturing process of the golf ball 10 and a process of producing the roughness on the surface of the coating layer 4 of the manufactured golf ball 10. The respective processes will hereinafter be described.

[Manufacturing Process of Golf Ball]

The description starts with the manufacturing process of the golf ball 10. The golf ball 10 can be manufactured by a known method. For instance, the golf ball 10 is manufactured as follows.

The spherical core 1 is molded by using a mold and other equivalent tools, and the intermediate layer 2 and the cover 3 are molded in this sequence around the core 1. The dimples 5 are molded concurrently with molding the cover 3. To be specific, a plurality of protruded portions for molding the dimples 5 is formed over a cavity of the mold for molding the cover 3.

Subsequently, the coating material is applied over the surface of the cover 3. The coating layer 4 is formed by drying this coating material. A coating method in the case of using a curing coating material is not particularly limited, and known methods may be adopted. By way of one instance, the coating method can be exemplified by spray coating, electrostatic coating and other equivalent coating methods.

In the spray coating using an air gun, a polyol component and a polyisocyanate component are supplied respectively by pumps and consecutively mixed by a line mixer disposed just anterior to the air gun, and a obtained mixture may be spray-coated, and polyol and polyisocyanate may also be separately coated by use of an air spray system equipped with a mixture ratio control mechanism. The coat may be conducted by one spray-coating process, and several layers of coat may also be applied a plural number of times.

The curing coating material applied over the golf ball 10 is dried at a temperature of, e.g., 30° C. to 70° C. for 1 to 24 hours, thereby enabling the coating layer 4 (coating film) to be formed.

[Process of Producing Roughness on Coating Layer]

Given next is a description of a process of producing the roughness on the surface of the coating layer 4 of the manufactured golf ball 10. A variety of methods of producing the roughness on the surface of the coating layer 4 exist, and can be properly selected corresponding to the embodiment. For instance, there are two methods that will be described below.

<Production of Roughness by Spraying Fine Particles>

Figure 5:
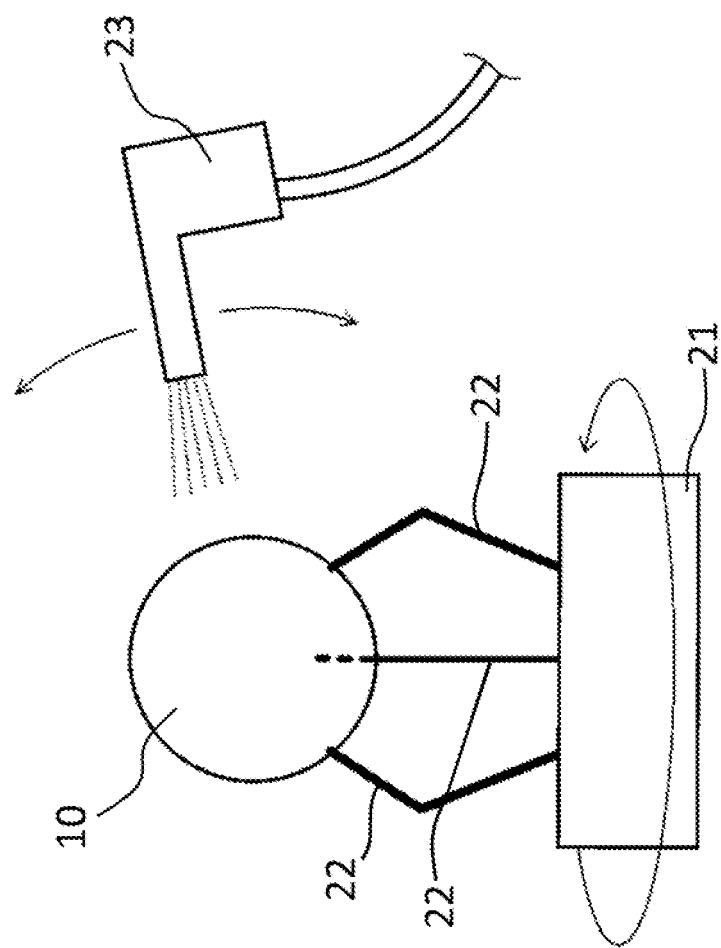
FIG. 5 is a view schematically illustrating a method for producing roughness by use of an airgun.

A method of producing the roughness by spraying fine particles will be described with reference to FIG. 5. FIG. 5 schematically illustrates the method of producing the roughness by spraying the fine particles. As depicted in FIG. 5, the roughness can be produced on the surface of the coating layer 4 by spraying the fine particles over the surface of the coating layer 4.

Specifically, an apparatus depicted in FIG. 5 includes a rotary body 21 serving as a seating, a plurality of support members 22 that are connected to the rotary body 21 and configured to support the golf ball 10, and an air gun 23 for spraying the fine particles over the supported golf ball 10. After the manufacturing process described above, the golf ball 10 not yet having the roughness (ruggedness) produced on the surface of the coating layer 4 is placed on the support members 22. In this state, the rotary body 21 rotates, and meantime, the air gun 23 sprays the fine particles over the golf ball 10 while suitably moving. The fine particles can be thereby sprayed over the entire surface of the coating layer 4.

Herein, when a pressure for spraying the fine particles is by far lower than the general standard, a possibility is that the desired roughness on the surface of the coating layer 4 cannot be acquired. Whereas when the pressure for spraying the fine particles is by far higher than the general standard, the fine particles break through the coating layer 4 and conceivably cause a damage to the cover 3. From this point of view, the pressure for spraying the fine particles is preferably 1 to 10 bar.

The fine particles used by this method may be properly selected corresponding to the embodiment. For instance, the fine particles to be sprayed over the coating layer 4 may involve using natural ores, synthetic resins, ceramic particles and other equivalent particles. The usable natural ores are, e.g., SiC, $SiO_2$, $AL_2O_3$, MgO and $Na_2O$, or mixtures thereof are also usable. For instance, the usable synthetic resins are thermoplastic resins or thermosetting resins each containing a melamine resin or another equivalent resin as a main component, or mixtures thereof are also usable. The usable ceramic particles are metal oxides instanced by zirconia and other equivalent oxides.

However, an average particle size of the fine particles to be sprayed is preferably equal to or larger than 50 μm in order to acquire the desired roughness on the surface of the coating layer 4. When the average particle size of the fine particles to be sprayed is smaller than 50 μm, the desired roughness on the surface of the coating layer 4 is not acquired, resulting in a possibility of being unable to give a desired aerodynamic effect to the golf ball 10. On the other hand, though an upper limit of the average particle size of the fine particles is not particularly restricted, the fine particles probably become hard to be sprayed when the particle size increases. Hence, the average particle size of the fine particles is preferably equal to or smaller than 500 μm.

Note that the apparatus to spray the fine particles over the coating layer 4 may not be limited to such an instance but is properly selectable corresponding to the embodiment. In the case of producing the roughness over the surface of the coating layer 4 by thus spraying the fine particles, when the thickness of the coating layer 4 is by far smaller than the general standard, the coating layer 4 is probably exfoliated upon spraying the fine particles. From this point of view, as described above, it is preferable that the thickness of the coating layer 4 is equal to or larger than 5.0 μm. The present method enables the desired roughness to be produced on the surface of the coating layer 4 by appropriately adjusting the average particle size of the fine particles, the spraying pressure, the spraying time and other equivalent values.

<Roughness Produced by Pressurizing Process>

Further, the roughness can be formed on the surface of the coating layer 4 by performing a pressurizing process without depending on the spraying of the fine particles. For instance, after forming the coating layer 4 in the manufacturing process, the golf ball 10 is put into the mold with the roughness being produced over an internal wall surface of the cavity, and the mold is subjected to the pressurizing process. The internal wall surface of the cavity is formed with the protruded portions and other equivalent portions for producing the desired roughness, and the desired roughness can be thereby produced on the surface of the coating layer 4.

The mold used in this process is not particularly limited as long as including the portions for producing the roughness, and, however, it is feasible to use the same mold as the mold employed for molding, e.g., the dimples 5. The roughness can be produced on the internal wall surface of the cavity by spraying the fine particles similarly to the foregoing method.

Note that the desired roughness on the surface of the coating layer 4 is not possibly acquired when the thickness of the coating layer 4 is by far smaller than the general standard in the case of producing the roughness by this method. From this point of view, as described above, the thickness of the coating layer 4 is preferably equal to or larger than 5.0 μm.

According to one aspect, the present embodiment aims at providing the golf ball exhibiting the excellent flying performance owing to the multiplier effect of the depth of the dimple and the roughness on the surface of the coating layer. As described above, the present embodiment enables the provision of the golf ball exhibiting the excellent flying performance owing to the multiplier effect of the depth of the dimple and the roughness on the surface of the coating layer.

§3 Modified Example

The in-depth description of the embodiment of the present invention has been made so far but is merely an exemplification of the present invention in every respect. It is a matter of course that a variety of improvements and modifications may be made without deviating from the scope of the present invention. For example, as discussed above, the core 1, the layer configuration including the intermediate layer 2 and the cover 3 is not limited to a specific number of layers, and it may be sufficient that the coating layer is coated over the surface of at least the outermost layer, i.e., the cover member. Note that, to give one instance, the golf ball 10 is configured based on a 3-piece structure including the core 1, the intermediate layer 2 and the cover 3 in the embodiment discussed above, and the golf ball may, however, be configured based on a 2-piece structure including the core and the cover.

WORKING EXAMPLES

Examples of the present invention will hereinafter be described. The present invention is not, however, limited to the Examples that follow.

[Manufacture of Golf Ball]

As demonstrated in following Table 1, 32 types of golf balls according to Example 1-18 and Comparative Example 1-14 were manufactured. The golf ball according to each of the respective Examples and Comparative Examples has substantially the same configuration as that of the golf ball 10 according to the embodiment described above. Full descriptions will hereinafter be made.

TABLE 1

| Type of Golf Ball | Comparative Example 1 | Comparative Example 2 | Comparative Example 3 | Comparative Example 4 | Comparative Example 5 | Comparative Example 6 |
|---|---|---|---|---|---|---|
| Dimple Type | D1 | D2 | D3 | D4 | D5 | D1 |
| Fa (mm) | 0.218 | 0.228 | 0.238 | 0.248 | 0.258 | 0.218 |
| Ra (μm) | 0.25 | 0.25 | 0.25 | 0.25 | 0.25 | 0.43 |

| Type of Golf Ball | Comparative Example 7 | Comparative Example 8 | Example 1 | Example 2 | Example 3 | Example 4 |
|---|---|---|---|---|---|---|
| Dimple Type | D2 | D3 | D4 | D5 | D2 | D3 |
| Fa (mm) | 0.228 | 0.238 | 0.248 | 0.258 | 0.228 | 0.238 |
| Ra (μm) | 0.43 | 0.43 | 0.43 | 0.43 | 0.54 | 0.54 |

| Type of Golf Ball | Example 5 | Example 6 | Example 7 | Example 8 | Example 9 | Example 10 |
|---|---|---|---|---|---|---|
| Dimple Type | D6 | D4 | D3 | D5 | D2 | D1 |
| Fa (mm) | 0.268 | 0.248 | 0.238 | 0.258 | 0.228 | 0.218 |
| Ra (μm) | 0.54 | 0.68 | 0.81 | 0.81 | 0.94 | 1.07 |

| Type of Golf Ball | Example 11 | Example 12 | Example 13 | Example 14 | Example 15 | Example 16 |
|---|---|---|---|---|---|---|
| Dimple Type | D6 | D3 | D4 | D2 | D3 | D4 |
| Fa (mm) | 0.268 | 0.238 | 0.248 | 0.228 | 0.238 | 0.248 |
| Ra (μm) | 1.07 | 1.20 | 1.20 | 1.33 | 1.33 | 1.33 |

| Type of Golf Ball | Example 17 | Comparative Example 9 | Comparative Example 10 | Comparative Example 11 | Comparative Example 12 | Comparative Example 13 |
|---|---|---|---|---|---|---|
| Dimple Type | D1 | D2 | D3 | D4 | D5 | D6 |
| Fa (mm) | 0.218 | 0.228 | 0.238 | 0.248 | 0.258 | 0.268 |
| Ra (μm) | 1.47 | 1.47 | 1.47 | 1.47 | 1.47 | 0.25 |

| Type of Golf Ball | Comparative Example 14 | Example 18 |
|---|---|---|
| Dimple Type | D6 | D5 |
| Fa (mm) | 0.268 | 0.258 |
| Ra (μm) | 1.47 | 1.33 |

(1) Manufacture of Core

In the respective Examples and Comparative Examples, high cis-polybutadiene (manufactured by JSR Corp., product name: BR-730) of 100 pts. mass, zinc acrylate of 35 pts. mass, zinc oxide of 5 pts. mass, barium sulfate of 5 pts. mass, diphenyl disulfide of 0.5 pts. mass, dicumyl peroxide of 0.9 pts. mass, and zinc octoate of 2.0 pts. mass were kneaded, whereby a rubber composition for the core was obtained. The rubber composition was put into the mold having a semi-spherical cavity and constructed from an upper mold and a lower mold and was heated at 170° C. for 18 min, with the result that a core having a diameter of 39.7 mm was acquired.

(2) Molding of Intermediate Layer

Subsequently, in the respective Examples and Comparative Examples, an ionomer resin (made by Du Pont Corp., product name: Surlyn 8945) of 50 pts. mass, another ionomer resin (Du Pont-Mitsui Polychemical Co., Ltd., product name: Himilan AM7329) of 50 pts. mass, titanium dioxide of 4 pts. mass, and ultramarine blue of 0.04 pts. mass were kneaded by a twin screw kneading extruder, whereby a resin composition for the intermediate layer was acquired. Then, in the respective Examples and Comparative Examples, the intermediate layer was formed by coating the resin composition over the periphery of each core by an injection molding method. A thickness of the intermediate layer was 1.0 mm.

(3) Molding of Reinforcing Layer

Next, in the respective Examples and Comparative Examples, a coating composition (Shinto Paint Co., Ltd., product name: Polyn 750LE) with the two-part curing type epoxy resin serving as base polymer was prepared. A main agent liquid of the coating composition is composed to include a bisphenol type-A solid epoxy resin of 30 pts. mass and a solvent of 70 pts. mass. A curing agent liquid of the coating composition is constructed to include denatured polyamidoamine of 40 pts. mass, the solvent of 55 pts. mass and titanium oxide of 5 pts. mass. A mass ratio of the main agent liquid and the curing agent liquid is 1/1. A reinforcing layer was acquired by spraying the coat composition over the surface of the intermediate layer by a spray gun and retaining the coat composition for 6 hours under an atmosphere of 23° C. A thickness of the reinforcing layer was 10 μm.

(4) Molding of Cover

Next, in the respective Examples and Comparative Examples, a resin composition for the cover was acquired by kneading thermoplastic polyurethane elastomer (made by BASF Japan Corp., product name: Elastollan XNY85) of 100 pts. mass and titanium dioxide of 4 pts. mass by the twin screw kneading extruder. Then, in the respective Examples and Comparative Examples, half shells were acquired from these resin compositions by a compression molding method. Note that the compression molding for the half shell was conducted under a condition that a molding temperature was 170° C., molding time was 5 min, and a molding pressure was 2.94 MPa.

A sphere configured to include the core, the intermediate layer and the reinforcing layer was coated with the two half shells. Further, the two half shells and the sphere were put into a final mold constructed of the upper mold and the lower mold each having a semi-spherical cavity with a cavity surface being provided with a multiplicity of pimples, and a cover having the plurality of dimples was acquired by the compression molding method. Note that the compression molding of the cover was performed under a condition that the molding temperature was 145° C., the molding time was 2 min, and the molding pressure was 9.8 MPa. A thickness of the cover was 0.5 mm in each the Examples and Comparative Examples.

Herein, in the respective Examples and Comparative Examples, the dimples depicted in FIGS. 3 and 4 were formed. However, in the respective Examples and Comparative Examples, as given below, the average value Fa (mm) of the maximum depths was adjusted by controlling the maximum depth Dp of the dimple. Specifically, the dimple of Type D1 illustrated in following Table 2 was formed in Examples 10, 17 and Comparative Examples 1, 6, respectively. Therefore, in the golf ball having the dimple of Type D1, the average value Fa (mm) of the maximum depths of the dimples was 0.218 mm.

In Examples 3, 9, 14 and comparative Examples 2, 7, 9, respectively, the dimple of Type D2 illustrated in following Table 2 was formed. Hence, in the golf ball having the dimple of Type D2, the average value Fa (mm) of the maximum depths of the dimples became 0.228 mm.

In Examples 4, 7, 12, 15 and comparative Examples 3, 8, 10, respectively, the dimple of Type D3 illustrated in following Table 2 was formed. Accordingly, in the golf ball having the dimple of Type D3, the average value Fa (mm) of the maximum depths of the dimples became 0.238 mm.

In Examples 1, 6, 13, 16 and comparative Examples 4, 11, respectively, the dimple of Type D4 illustrated in following Table 2 was formed. Accordingly, in the golf ball having the dimple of Type D4, the average value Fa (mm) of the maximum depths of the dimples became 0.248 mm.

In Examples 2, 8, 18 and comparative Examples 5, 12, respectively, the dimple of Type D5 illustrated in following Table 2 was formed. Consequently, in the golf ball having the dimple of Type D5, the average value Fa (mm) of the maximum depths of the dimples became 0.258 mm.

In Examples 5, 11 and comparative Examples 13, 14, respectively, the dimple of Type D6 illustrated in following Table 2 was formed. Hence, in the golf ball having the dimple of Type D6, the average value Fa (mm) of the maximum depths of the dimples became 0.268 mm.

TABLE 2

| Type | Number | Diameter Dm (mm) | Maximum Depth Dp (mm) | Curvature CR (mm) | Volume (mm$^3$) | Total Volume (mm$^3$) |
|---|---|---|---|---|---|---|
| D1 | A | 72 | 4.60 | 0.244 | 22.1 | 2.03 | 146.3 |
|  | B | 54 | 4.50 | 0.229 | 23.1 | 1.82 | 98.4 |
|  | C | 30 | 4.30 | 0.219 | 21.1 | 1.59 | 47.6 |
|  | D | 54 | 4.20 | 0.214 | 20.1 | 1.48 | 79.9 |
|  | E | 108 | 4.00 | 0.204 | 18.2 | 1.28 | 138.5 |
|  | F | 12 | 2.90 | 0.149 | 10.6 | 0.49 | 5.9 |
|  | Total | 330 | — | — | — | — | 516.6 |
| D2 | A | 72 | 4.60 | 0.254 | 20.4 | 2.11 | 152.3 |
|  | B | 54 | 4.50 | 0.239 | 21.2 | 1.90 | 102.7 |
|  | C | 30 | 4.30 | 0.229 | 19.3 | 1.66 | 49.8 |
|  | D | 54 | 4.20 | 0.224 | 18.4 | 1.55 | 83.7 |

TABLE 2-continued

| Type | Number | Diameter Dm (mm) | Maximum Depth Dp (mm) | Curvature CR (mm) | Volume (mm$^3$) | Total Volume (mm$^3$) |
|---|---|---|---|---|---|---|
|  | E | 108 | 4.00 | 0.214 | 16.7 | 1.35 | 145.3 |
|  | F | 12 | 2.90 | 0.159 | 9.6 | 0.53 | 6.3 |
|  | Total | 330 | — | — | — | — | 540.1 |
| D3 | A | 72 | 4.60 | 0.264 | 19.0 | 2.20 | 158.3 |
|  | B | 54 | 4.50 | 0.249 | 19.5 | 1.98 | 107.0 |
|  | C | 30 | 4.30 | 0.239 | 17.8 | 1.73 | 52.0 |
|  | D | 54 | 4.20 | 0.234 | 17.0 | 1.62 | 87.4 |
|  | E | 108 | 4.00 | 0.224 | 15.4 | 1.41 | 152.1 |
|  | F | 12 | 2.90 | 0.169 | 8.8 | 0.56 | 6.7 |
|  | Total | 330 | — | — | — | — | 563.5 |
| D4 | A | 72 | 4.60 | 0.274 | 17.7 | 2.28 | 164.3 |
|  | B | 54 | 4.50 | 0.259 | 18.2 | 2.06 | 111.3 |
|  | C | 30 | 4.30 | 0.249 | 16.6 | 1.81 | 54.2 |
|  | D | 54 | 4.20 | 0.244 | 15.8 | 1.69 | 91.2 |
|  | E | 108 | 4.00 | 0.234 | 14.4 | 1.47 | 158.9 |
|  | F | 12 | 2.90 | 0.179 | 8.2 | 0.59 | 7.1 |
|  | Total | 330 | — | — | — | — | 587.0 |
| D5 | A | 72 | 4.60 | 0.284 | 16.6 | 2.37 | 170.3 |
|  | B | 54 | 4.50 | 0.269 | 17.0 | 2.14 | 115.6 |
|  | C | 30 | 4.30 | 0.259 | 15.5 | 1.88 | 56.4 |
|  | D | 54 | 4.20 | 0.254 | 14.8 | 1.76 | 95.0 |
|  | E | 108 | 4.00 | 0.244 | 13.4 | 1.53 | 165.7 |
|  | F | 12 | 2.90 | 0.189 | 7.6 | 0.63 | 7.5 |
|  | Total | 330 | — | — | — | — | 610.5 |
| D6 | A | 72 | 4.60 | 0.294 | 15.6 | 2.45 | 176.3 |
|  | B | 54 | 4.50 | 0.279 | 15.9 | 2.22 | 119.9 |
|  | C | 30 | 4.30 | 0.269 | 14.5 | 1.95 | 58.6 |
|  | D | 54 | 4.20 | 0.264 | 13.9 | 1.83 | 98.7 |
|  | E | 108 | 4.00 | 0.254 | 12.6 | 1.60 | 172.6 |
|  | F | 12 | 2.90 | 0.199 | 7.1 | 0.66 | 7.9 |
|  | Total | 330 | — | — | — | — | 634.0 |

Figure 6:
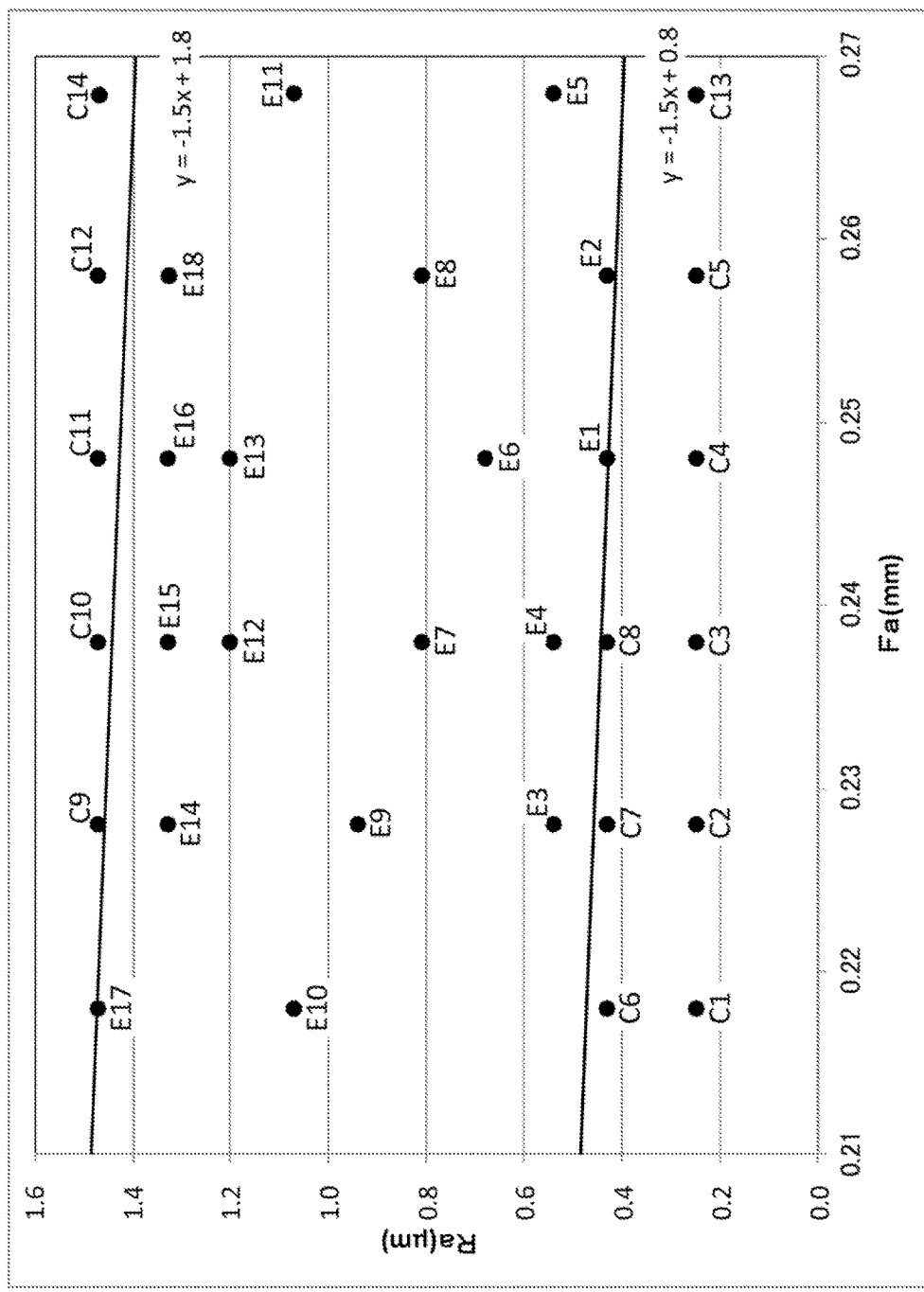
FIG. 6 is a graph depicting a relation between an average maximum height Fa of the dimples and arithmetic average roughness Ra of the coating layer of the golf ball according to the Examples and Comparative Examples.

Note that FIG. 6 is a graph depicting a relation between an average maximum height Fa of the dimples and the arithmetic average roughness Ra of the coating layer of the golf ball according to the respective Examples and Comparative Examples. Herein, in FIG. 6, Examples 1-18 were notated by E1-E18, while Comparative Examples 1-14 were notated by C1-C14, respectively.

(5) Formation of Coating Layer

Next, in the respective Examples and Comparative Examples, a coating material was prepared by blending polyol and polyisocyanate given in following Table 3. Note that the coating material was prepared by using a mixed solvent of toluene and MEK (methyl ethyl ketone) as a main agent so that a concentration of the polyol component becomes 30% by mass. The curing agent was prepared by using a mixed solvent of MEK, n-Butyl acetate and toluene as solvents so that the concentration of the polyisocyanate becomes 60% by mass.

TABLE 3

| Name of Material | Blending Ratio |
|---|---|
| Curing Agent ※1) | HDI burette denatured body/ HDI isocyanurate denatured body | 40/20 |
|  | IPDI component (IPDI isocyanurate denatured body) | 40 |
| Curing Agent/Main Agent (NCO/OH Molar Ratio) | 0.5/1.0 |

※1) Blending of Curing Agent:Mass ratio

Note that the following products were used as raw materials for blending.

(Main Agent)

Polyn #950 made by Shinto Paint Co., Ltd.: hydroxyl value 128 mgKOH/g, urethan polyol containing a polyol component (trimethylol-propane, polyoxy-tetramethylene glycol) and a polyisocyanate component (isophorone diisocyanate).
(Curing Agent)
(i) An isocyanurate denatured body of hexamethylene-diisocyanate: Duranate TKA-100 (NCO content by percentage: 21.7%) made by Asahi Kasei Chemicals Corp.
(ii) A burette denatured body of hexamethylene-diisocyanate: Duranate 21S-75E (NCO content by percentage: 15.5%) made by Asahi Kasei Chemicals Corp.
(iii) An isocyanurate denatured body of isophorone-diisocyanate: VESTANAT T1890 (NCO content by percentage: 12.0%) made by Degussa Corp.

In the respective Examples and Comparative Examples, the coating layer was formed by spreading the coating material of each compound over the periphery of the cover. To be specific, each coating material was spread while moving the air gun being spaced away at a spraying distance (7 cm) from each golf ball in up-and-down directions by rotating the rotary body on which each golf ball was placed at 300 rpm. An interval, at which several layers of coat were applied each time, was set to 1.0 sec. A spraying condition of the air gun was set such that a spraying air pressure was 0.15 MPa, a pumping tank air pressure was 0.10 MPa, a period of single-coating time was 1 sec, an atmospheric temperature was within a range of 20° C.-27° C., and an atmospheric humidity was equal to or smaller than 65%. Thereafter, the coating material was dried at 40° C. in an oven for 24 hours. In the respective Examples and Comparative Examples, the coating layer having a thickness of 20 μm was thereby formed. As a result, in the respective Examples and Comparative Examples, the golf ball with the diameter being approximately 42.7 mm and the mass being approximately 45.6 g was acquired.

Note that a compressed deformation quantity of the golf ball was measured in the respective Examples and Comparative Examples. The compressed deformation quantity was approximately 2.45 mm when a load was set to 98N-1274N in the respective Examples and Comparative Examples.

(6) Production of Roughness on Surface of Coating Layer

Finally, in the respective Examples and Comparative Examples exclusive of Comparative Examples 1 to 5 and 13, the roughness was produced on the coating layer of the golf ball by the following method. To be specific, after forming the coating layer, the fine particles were sprayed by the air gun having a nozzle diameter of 8 mm. Ceramic particles containing zirconia as a main component and having a particle size of 75 μm to 250 μm were used as the fine particles. At that time, the golf balls were put by twenties into predetermined processing equipment, and the desired roughness was produced on the coating layer of each golf ball by appropriately controlling the pressure, the time and the particle size of the fine particle while rotating the equipment. In Comparative Examples 1 to 5 and 13, this process was omitted. The roughness of the coating layer of each golf ball was as given in Table 1.

Note that the arithmetic average roughness Ra (μm) was measured by using a surface roughness/contour shape measurement machine (made by Tokyo Seimitsu Co., Ltd., product name: Surfcom130A). In the respective Examples and Comparative Examples, the golf balls were prepared by sixes, and roughness values were measured at six points within an arbitrary dimple of each golf ball, and an average value of those roughness values was set as the arithmetic average roughness Ra (μm) of that golf ball.

[Measurement Method]
(1) Compressed Deformation Quantity of Core

A deformation quantity (a quantity of how much the golf ball or the core shrunk in a compression direction) in the compression direction till when a final load 1275N was applied from a state of applying an initial load 98N to the core was measured as the compressed deformation quantity of the core.

(2) 10% Modulus of Coating Layer

A coating film was prepared by drying and curing the coating material, acquired by blending the main agent and the curing agent, of the coating layer at 40° C. for 4 hours. Pursuant to JIS-K7161, a test piece was prepared by punching out the coating film in a dumbbell shape (gauge length: 20 mm, width of parallel portion: 10 mm), physical properties of the coating layer were measure by use of a peel strength test measurement apparatus made by Shimadzu Corp., and a modulus (tensile modulus of elasticity) when stretched at 10% was calculated.

Film thickness of test piece: 0.05 mm
Tension speed: 50 mm/min
Measurement Temperature: 23° C.

[Carry Test]

Performed was a carry test given below for the thus-manufacture golf ball in the respective Examples and Comparative Examples. At first, a driver club (made by Dunlop Sports Co., Ltd., product name: SRIXON Z-TX, shaft hardness: X, loft angle: 8.5 degrees) equipped with a head composed of a titanium alloy was mounted in a swing machine of Golf Laboratories, Inc. Next, the swing machine was adjusted so that a head speed was 50 m/s, a hitting angle (launch angle) was approximately 10 degrees, and a spin quantity was approximately 2500 rpm. The swing machine hit the golf balls by twenties in the respective Examples and Comparative Examples, in which case distances from launching points to static points were measured, and an average value was examined. Note that a wind direction was substantially windless when performing the test. Following Table 4 shows results of the carry test.

TABLE 4

| Type of Golf Ball | Comparative Example 1 | Comparative Example 2 | Comparative Example 3 | Comparative Example 4 | Comparative Example 5 | Comparative Example 6 |
|---|---|---|---|---|---|---|
| Carry (m) | 261.1 | 262.0 | 263.5 | 263.0 | 262.4 | 261.7 |
| Carry Difference (m) | −2.4 | −1.5 | 0.0 | −0.5 | −1.1 | −1.8 |

| Type of Golf Ball | Comparative Example 7 | Comparative Example 8 | Example 1 | Example 2 | Example 3 | Example 4 |
|---|---|---|---|---|---|---|
| Carry (m) | 263.0 | 264.1 | 264.6 | 264.5 | 264.5 | 265.5 |
| Carry Difference (m) | −0.5 | 0.6 | 1.1 | 1.0 | 1.0 | 2.0 |

TABLE 4-continued

| Type of Golf Ball | Example 5 | Example 6 | Example 7 | Example 8 | Example 9 | Example 10 |
|---|---|---|---|---|---|---|
| Carry (m) | 264.7 | 265.6 | 266.2 | 264.8 | 265.5 | 265.0 |
| Carry Difference (m) | 1.2 | 2.1 | 2.7 | 1.3 | 2.0 | 1.5 |
| Type of Golf Ball | Example 11 | Example 12 | Example 13 | Example 14 | Example 15 | Example 16 |
| Carry (m) | 264.6 | 265.3 | 264.7 | 264.8 | 264.6 | 264.5 |
| Carry Difference (m) | 1.1 | 1.8 | 1.2 | 1.3 | 1.1 | 1.0 |
| Type of Golf Ball | Example 17 | Comparative Example 9 | Comparative Example 10 | Comparative Example 11 | Comparative Example 12 | Comparative Example 13 |
| Carry (m) | 264.6 | 264.3 | 264.1 | 264.0 | 263.8 | 262.0 |
| Carry Difference (m) | 1.1 | 0.8 | 0.6 | 0.5 | 0.3 | −1.5 |

| Type of Golf Ball | Comparative Example 14 | Example 18 |
|---|---|---|
| Carry (m) | 263.6 | 264.5 |
| Carry Difference (m) | 0.1 | 1.0 |

Note that [Carry Difference (m)] in Table 4 connotes a difference of the carry from Comparative Example 3.

[Evaluation]

As demonstrated in Table 4, the carry in each Example was longer than in each Comparative Example. Particularly, the carry in each Example was longer by 1 or more yards than in Comparative Example 3. In comparisons between Example 17 and Comparative Examples 9-12, the carry decreased as the average value Fa (mm) of the maximum depths of the dimples increased. On the other hand, in comparisons between Examples 1, 2 and Comparative Examples 6-8, the carry was basically extended owing to the increase in average value Fa (mm) of the maximum depths of the dimples. Further, when comparing the Examples (4, 7, 12 and 15) and the Comparative Examples (3, 8 and 10) having the same type of dimples with each other, it was recognized that the carry was not extended simply by increasing the degree of roughness on the surface of the coating layer. To be specific, it was recognized that the carry initially had an increasing tendency as the degree of roughness on the surface of the coating layer was increased but thereafter had a decreasing tendency. It was presumed from these recognitions that such a correlation between the depth of the dimple and the roughness on the surface of the coating layer as to enable enhancement of the carry performance of the golf ball, could be specified by the relational expression given in the Mathematical Expression 1.

The invention claimed is:

1. A golf ball comprising:
   a spherical core;
   one or more cover members to cover the core; and
   a coating layer to coat a cover member configuring an outermost layer of the one or more cover members, wherein:
   a plurality of dimples being formed in the cover member of the outermost layer,
   roughness being produced on a surface of the coating layer after applying a coat over the cover member of the outermost layer, and
   an average value Fa (mm) of maximum depths of the plurality of dimples and arithmetic average roughness Ra (μm) on the surface of the coating layer, satisfy a relational expression:

$$-1.5 \times Fa + 0.8 \leq Ra \leq -1.5 \times Fa + 1.8,$$

wherein the arithmetic average roughness Ra is equal to or larger than 0.6 μm and equal to or smaller than 0.9 μm, and
   the average value Fa is equal to or larger than 0.22 mm and equal to or smaller than 0.31 mm.

2. The golf ball according to claim 1, wherein the roughness on the surface of the coating layer is acquired by a surface treatment of spraying fine particles over the surface.

3. A method for manufacturing a golf ball, comprising:
   a step of forming a spherical core;
   a step of covering the core with one or more cover members, and forming a plurality of dimples in a cover member configuring an outermost layer of the one or more cover members;
   a step of coating the cover member of the outermost layer with a coating layer; and
   a step of producing roughness on a surface of the coating layer,
   wherein an average value Fa (mm) of maximum depths of the plurality of dimples to be formed and arithmetic average roughness Ra (μm) on the surface of the coating layer, satisfy a relational expression:

$$-1.5 \times Fa + 0.8 \leq Ra \leq -1.5 \times Fa + 1.8,$$

wherein the arithmetic average roughness Ra is equal to or larger than 0.6 μm and equal to or smaller than 0.9 μm, and
   the average value Fa is equal to or larger than 0.22 mm and equal to or smaller than 0.31 mm.

* * * * *